United States Patent
Burago et al.

(10) Patent No.: US 7,870,500 B2
(45) Date of Patent: Jan. 11, 2011

(54) POSITIONING OF FLOATING OBJECTS IN ELECTRONIC DOCUMENTS

(75) Inventors: Andrei Burago, Kirkland, WA (US); Eliyezer Kohen, Mercer Island, WA (US); Sergey Genkin, Kirkland, WA (US); Victor E. Kozyrev, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 397 days.

(21) Appl. No.: 11/182,471

(22) Filed: Jul. 15, 2005

(65) Prior Publication Data

US 2007/0016854 A1 Jan. 18, 2007

(51) Int. Cl.
G06F 3/048 (2006.01)
G06F 17/21 (2006.01)
G06T 11/60 (2006.01)

(52) U.S. Cl. ............... 715/764; 715/210; 715/246
(58) Field of Classification Search ............... 715/764, 715/210, 246
See application file for complete search history.

(56) References Cited

U.S. PATENT DOCUMENTS

| 5,214,755 | A | | 5/1993 | Mason | |
|---|---|---|---|---|---|
| 5,517,621 | A | * | 5/1996 | Fukui et al. | 715/517 |
| 5,553,217 | A | * | 9/1996 | Hart et al. | 715/210 |
| 5,742,837 | A | * | 4/1998 | Fukui et al. | 715/210 |
| 5,838,317 | A | * | 11/1998 | Bolnick et al. | 715/764 |
| 6,026,417 | A | * | 2/2000 | Ross et al. | 715/210 |
| 6,589,292 | B1 | * | 7/2003 | Langford-Wilson | 715/246 |
| 7,554,689 | B2 | * | 6/2009 | Tonisson | 358/1.18 |
| 2005/0102628 | A1 | * | 5/2005 | Salesin et al. | 715/764 |
| 2006/0103667 | A1 | * | 5/2006 | Amit et al. | 345/619 |

OTHER PUBLICATIONS

Pohja et. al, "CSS layout engine for compound documents", Proceedings of the Third Latin American Web Congress LA-WEB 2005.*

* cited by examiner

*Primary Examiner*—William L Bashore
*Assistant Examiner*—Jordany Núñez
(74) *Attorney, Agent, or Firm*—Merchant & Gould PC (57) ABSTRACT

An approach for positioning a floating object in a workspace of an electronic document is disclosed herein. To accomplish this, the workspace is divided into a plurality of available portions in which floating objects may be positioned. For example, these available portions represent geometrical areas within the workspace that do not include obstacles, such as absolutely positioned objects and other floating objects. The available portions are then evaluated against a plurality of undesirable positioning characteristics in order to determine an optimal position for the floating object within the workspace. The optimal position is then determined to be either a location in the workspace that does not result in any of the undesirable characteristics or, alternatively, a location having the most tolerable of the potentially resultant undesired characteristics.

17 Claims, 9 Drawing Sheets

POSITIONING OF FLOATING OBJECTS IN ELECTRONIC DOCUMENTS

BACKGROUND OF THE INVENTION

Conventional document processing applications provide users the ability to insert various types of objects into electronic documents under creation or maintenance. The objects represent any form of data and include, for example, graphics, tables, icons, graphs and other electronic documents (e.g., spreadsheets, word processing documents, etc.). Generally, the objects are categorized as being either absolutely positioned objects or floating objects.

An absolutely positioned object is an object having an absolute position on a page in an electronic document. As such, text is input into the electronic document around absolutely positioned objects. In contrast, a floating object is an object that is not tied to any particular position in an electronic document. While unbounded within a host electronic document, a floating object may be, and typically is, constrained to a particular position within a body of text. That is, as text preceding a floating object is added to or deleted from the document, the position of that floating object is modified relative to its position within the document, but the position of that floating object relative to the remaining text does not change.

The positioning of floating objects in electronic documents is not an easy task. Oftentimes, floating objects are positioned in undesirable positions within an electronic document, as is the case in which the document includes obstacles, such as absolutely positioned objects and other floating objects. The obstacles work against the floating objects and tend to affect the positioning of floating objects in the document in an adverse way. For example, floating objects typically have internal properties that are completely disregarded in favor of positioning the objects around obstacles. Yet another example relates the positioning of floating objects adjacent obstacles, which, in turn, causes the floating object to extend across outer boundaries (e.g., margins) defined for the host electronic document.

It is with respect to these and other considerations that the present invention has been made.

SUMMARY OF THE INVENTION

The present invention is generally related to positioning floating objects within electronic documents while addressing the above-mentioned and other undesirable positioning characteristics. In this regard, an embodiment of the present invention provides a computer-implemented method for determining an optimal position for a floating object within the workspace of an electronic document. Generally, the method takes into consideration a predetermined set of undesirable positioning characteristics prior to actually positioning the floating object. To accomplish this, each of the undesirable positioning characteristics is associated with a predetermined tolerability relative to all other undesirable positioning characteristics in the set. To the extent that placement of the floating object in the workspace would result in an undesirable characteristic, the method selects the optimal position for the floating object in accordance with the most tolerable of the possibly resultant undesirable characteristics.

In an embodiment, the method involves dividing the workspace into a plurality of available portions that represent geometrical areas operable to contain floating objects. As such, the available portions are sections in the workspace that preferably don't include any obstacles. The method then involves evaluating placement of the floating object into the available portions against the set of undesirable positioning characteristics. If placement of the floating object into one of the available portions would not result in any of the undesirable positioning characteristics, the method determines that available portion to be the optimal position for the floating object in the workspace. Otherwise, if placement of the floating object into each of the available portions would result in at least one undesirable positioning characteristic, the method determines one of the available portions to the optimal position based on greatest tolerability.

The various embodiments of the present invention may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION OF THE INVENTION

The present invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

In general, the present invention relates to positioning floating objects within an electronic document. As used herein, a "floating object" generally refers to any object that is not an absolutely positioned object, as defined in the Background above. In accordance with an exemplary embodiment, the present invention is described with reference to the floating objects being tables and the electronic documents being word processing documents. Further, in accordance with this exemplary embodiment, the floating objects are described as being positioned within a text flow and, consequently, the word processing documents are described herein as having text that "precedes" the floating objects. For example, FIG. 1 illustrates a table 100 being positioned within a word processing document 102 in the text flow after a body of text 134, wherein the document includes two absolutely positioned objects 120 and 122.

The table 100 is shown having directional arrows 101 in order to illustrate that the table 100 is a floating object as opposed to an absolutely positioned object (e.g., 120 and 122) which, in contrast, does not have directional arrows 101. As is known to those skilled in the art, the document 102 includes one or more pages each having a top margin 104, a right margin 106, a left margin 108 and a bottom margin 110. Although shown within only one page, those skilled in the art will appreciate that the document 102 may include any number of pages. The margins 104, 106, 108 and 110 collectively form a circumferential border around the individual pages of the document 102 thereby creating a workspace area 112 (hereinafter, "workspace") in which a user may input and edit information such as, for example, text (e.g., 136), absolutely positioned objects (e.g., 120 and 122) and floating objects (e.g., 100). The workspace 112 may span any number of pages in the document 102 but, as noted above, only one page of the document 102 is shown in FIG. 1 for illustration purposes, and consequently, the workspace 112 is shown as embodying only a single page.

In accordance with an embodiment, the workspace 112 may include other workspaces such as the case with a word processing document having a multi-column layout. In this embodiment, the boundaries, or delimiters, of the embedded workspaces are column borders. In accordance with yet another embodiment, embedded workspaces may embody cells within a table, and in accordance with this embodiment, the boundaries, or delimiters, of the embedded workspaces are row borders and column borders. That said, references to the workspace 112 in the following description are intended to refer to a workspace area in general without any limitation as to the number pages that the workspace 112 spans or the type of delimiters (e.g., margins, column and row borders) by which the workspace 112 is bounded.

Figure 1:
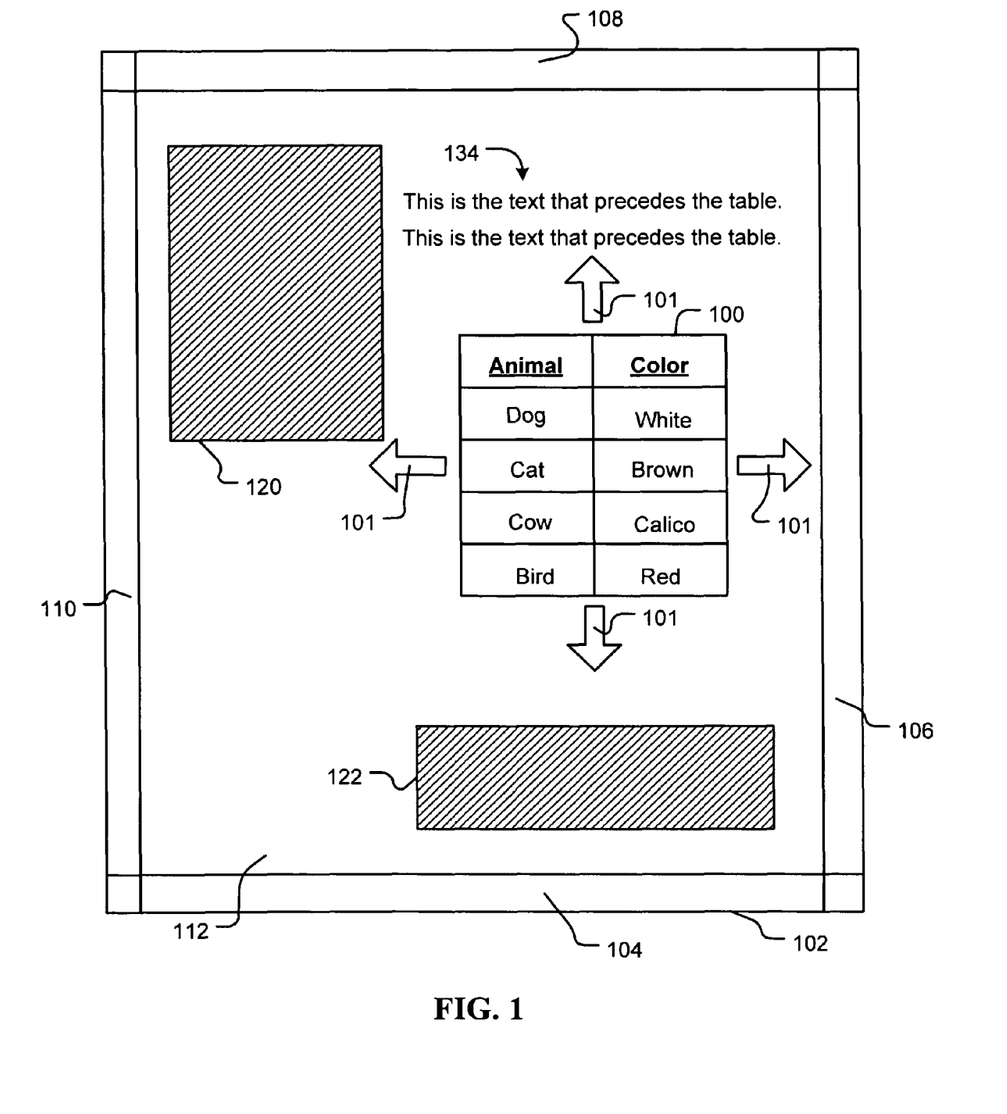
FIG. 1 illustrates an electronic document in which a floating object is being positioned in accordance with an embodiment of the present invention.

In accordance with an exemplary embodiment, FIG. 1 illustrates the document 102 at a point in time after a request to insert the table 100 into the document 100 has been issued (e.g., by user or application program), but prior to the actual insertion of the table 100 therein. In this regard, FIG. 1 conceptually depicts the document 102 at a point in time during which the table 100 is being positioned for insertion into the workspace 112 after the text 134. FIG. 1 is therefore further described herein with reference to FIG. 3, which embodies a process for positioning floating objects within electronic documents.

Figure 2:
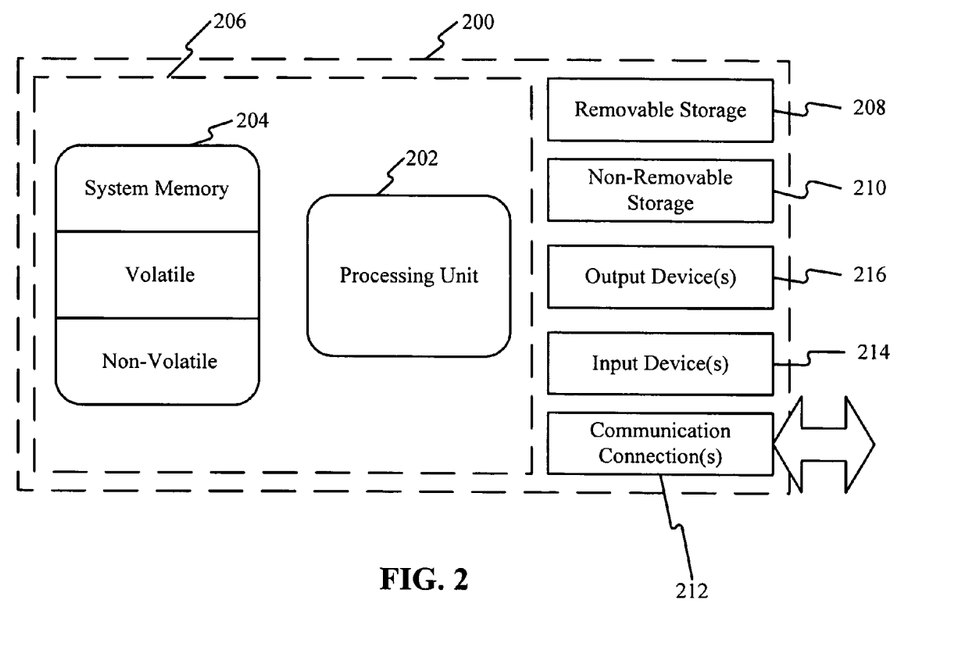
FIG. 2 shows an exemplary computer system upon which embodiments of the present invention may be implemented.
Figure 3:
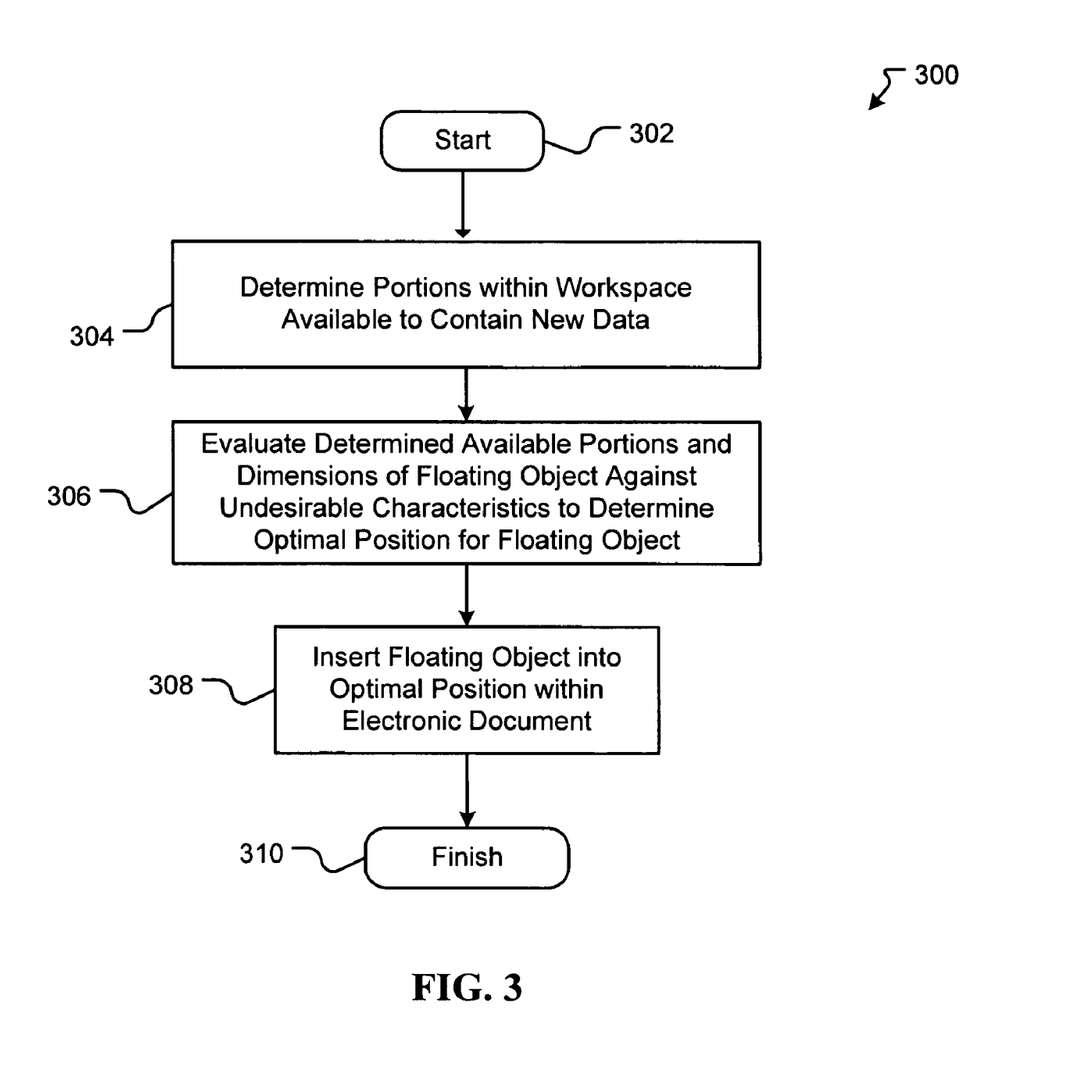
FIG. 3 is a flow diagram illustrating operational characteristics of a process for positioning the floating object of FIG. 1 within the electronic document in accordance with an embodiment of the present invention.

More specifically, FIG. 3 illustrates, in flow diagram form, a process 300 for positioning the table 100 in the workspace 112 of the word processing document 102 taking into consideration a predetermined set of undesirable positioning characteristics in accordance with an embodiment of the present invention. The undesirable positioning characteristics generally specify undesirable conditions that can result from the positioning of floating objects around obstacles in the workspace 112. As used herein, the term "obstacle" generally refers to an object already included in the workspace 112 including, for example, an absolutely positioned object (e.g., 120 and 122) or any other floating object that has already been positioned in the workspace 112. Prior to further describing FIG. 1 in connection with the positioning process 300 of FIG. 3, however, an exemplary computing environment (e.g., computing device 200) for practicing the positioning process 300 is set forth in connection with FIG. 2.

In its most basic configuration, the computing device 200 includes at least one processing unit 202 and memory 204. Depending on the exact configuration and type of computing device 200, the memory 204 may be volatile (such as RAM), non-volatile (such as ROM, flash memory, etc.) or some combination of the two. The most basic configuration of the computing device 200 is illustrated in FIG. 2 by dashed line 206. Additionally, computing device 200 may also have additional features/functionality. For example, computing device 200 may also include additional storage (removable and/or non-removable) including, but not limited to, magnetic or optical disks or tape. Such additional storage is illustrated in FIG. 2 by removable storage 208 and non-removable storage 210.

Computer storage media, as used herein, includes volatile and nonvolatile, removable and non-removable media implemented in any method or technology for storage of information, such as computer readable instructions, data structures, program modules, or other data. Memory 204, removable storage 208 and non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 200. Any such computer storage media may be part of device 200.

The computing device 200 may also contain communications connection(s) 212 for communicating with other devices. The communications connection(s) 212 is/are an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media.

The computing device 200 may also have input device(s) 214 such as keyboard, mouse, pen, voice input device, touch input device, etc. Output device(s) 216 such as a display, speakers, printer, etc. may also be included. The devices may help form the user interface 102 discussed above. All these devices are well know in the art and need not be discussed at length here.

The computing device 200 typically includes at least some form of computer readable media. Computer readable media can be any available media that can be accessed by processing unit 202. By way of example, and not limitation, computer readable media may comprise computer storage media and communication media. Combinations of any of the above should also be included within the scope of computer readable media.

The computing device 200 may operate in a networked environment using logical connections to one or more remote computers (not shown). The remote computer may be a personal computer, a server computer system, a router, a network PC, a peer device or other common network node, and typically includes many or all of the elements described above relative to the computer device 200. The logical connections between the computer device 200 and the remote computer may include a local area network (LAN) or a wide area network (WAN), but may also include other networks. Such networking environments are commonplace in offices, enterprise-wide computer networks, intranets, and the Internet.

When used in a LAN networking environment, the computer device 200 is connected to the LAN through a network interface or adapter. When used in a WAN networking environment, the computing device 200 typically includes a modem or other means for establishing communications over the WAN, such as the Internet. The modem, which may be internal or external, may be connected to the computer processor 202 via the communication connections 212, or other appropriate mechanism. In a networked environment, program modules or portions thereof may be stored in the remote memory storage device. By way of example, and not limitation, a remote application programs may reside on memory device connected to the remote computer system. It will be appreciated that the network connections explained are exemplary and other means of establishing a communications link between the computers may be used.

With the computing environment of FIG. 2 in mind, the positioning process 300 shown in FIG. 3 embodies operational characteristics practiced by an application program implemented on the computing device 200. Exemplary application programs include, but certainly are not limited to, word processing applications, spreadsheet applications, presentation applications, electronic mail applications and web browsers. In accordance with an embodiment of the present invention, a set of undesirable characteristics concerning the positioning of floating objects within electronic documents is defined as part of the application program. These characteristics, each of which are associated with a specific tolerability score, may be defined by either the developer of the application program or a user of the application program (e.g., by selecting specific undesirable characteristics defined by the developer).

The positioning process 300 is performed using an operation flow that begins with a start operation 302 and concludes with a terminate operation 310. The start operation 302 is initiated in response to a request from a user of the application program or, alternatively, the application program itself, to position the table 100 within the document 102. For example, such a request may originate from a user's request to insert the table 100 after the text 134 in the workspace 112 as described above in accordance with an exemplary embodiment of the present invention.

From the start operation 302, the operation flow passes to an evaluate operation 304. The evaluate operation 304 evaluates the workspace 112 to determine available portions therein. Generally, available portions are sections within the workspace 112 that currently do not include an obstacle and, thus, are available to accept text and floating objects. In accordance with an exemplary embodiment, the available portions embody layout rectangles that logically represent rectangular areas within the workspace 112 devoid of any obstacles.

Figure 4:
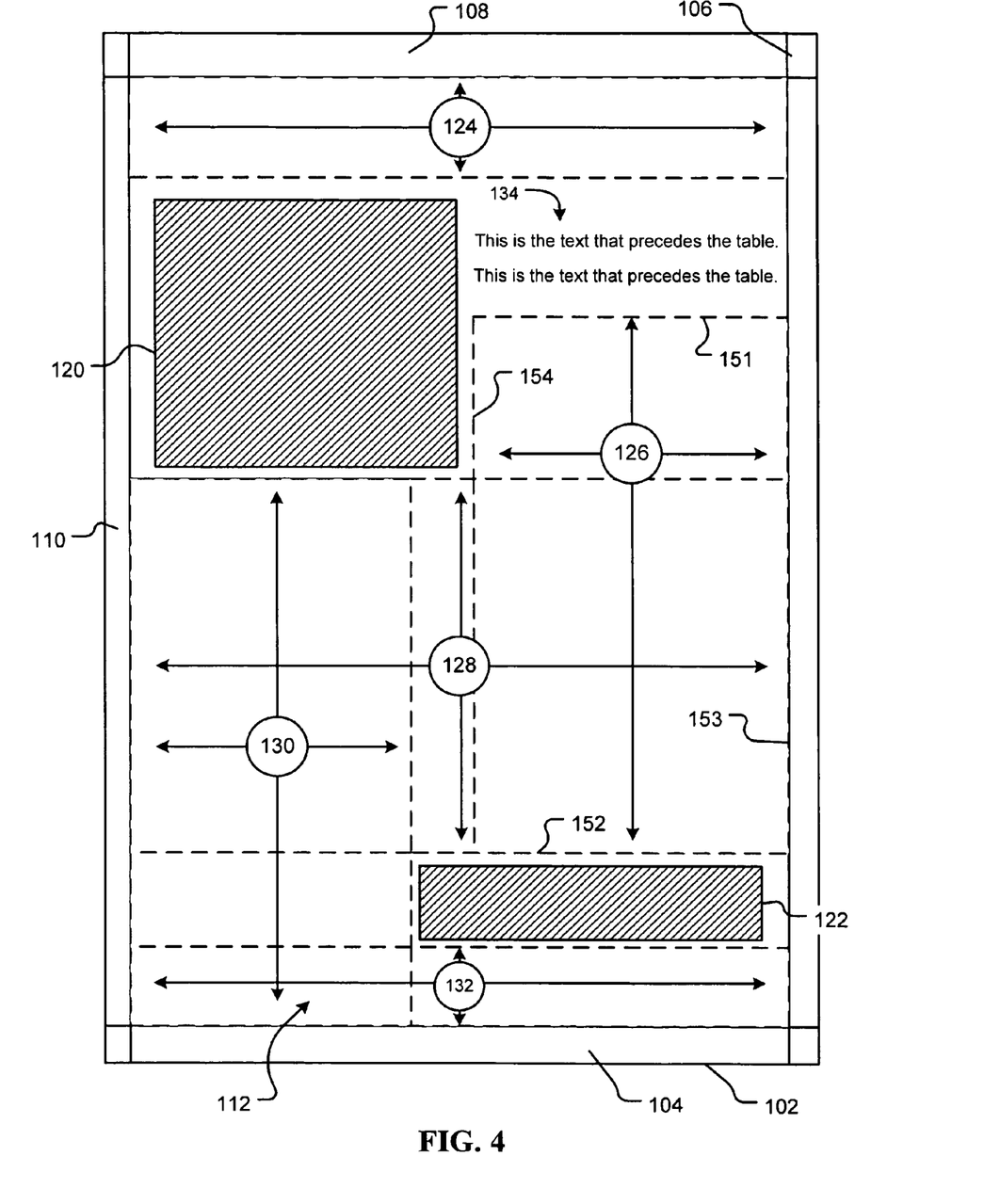
FIG. 4 illustrates division of the electronic document of FIG. 1 into a plurality of available portions into which information may be accepted in accordance with an embodiment of the present invention.

For example, FIG. 4 illustrates division of the workspace 112 into a plurality of layout rectangles 124, 126, 128, 130 and 132 each having an upper boundary (e.g., 151), a lower boundary (e.g., 152), a right boundary (e.g., 153) and a left boundary (e.g., 154). In accordance with an embodiment, division of the workspace 112 into layout rectangles involves the logical acts of drawing the layout rectangles 124, 126, 128, 130 and 132 one at a time in the workspace 112 such that no rectangle 124, 126, 128, 130 and 132 encompasses either of the obstacles 120 or 122 or text 134 already entered into the workspace 112. These logical acts are performed by alternating creation of horizontally-situated and vertically-situated layout rectangles within the workspace 112, as described in detail in U.S. Pat. No. 5,214,755, which is assigned to Microsoft Corporation. It should be appreciated that the available portions into which the workspace 112 is divided may take forms other than rectangle shapes and, consequently, determination of these portions may be made by approaches other than that cited above.

Referring back to FIG. 3, the operation flow passes to an analysis operation 306 after the evaluate operation 304 has determined the available portions within the workspace 112. The analysis operation 306 evaluates the available portions and the dimensions of the table 100 against the predetermined set of undesirable characteristics to determine an optimal position for the table 100 in the workspace 112. In an embodiment, the analysis operation 306 determines the optimal position to be within one of the available portions. In another embodiment, the analysis operation 306 determines the optimal position to be based on a selected one of the available portions, in which case, a specific coordinate point (e.g., top right-hand corner) of the table 100 is matched to a specific coordinate point (e.g., top right-hand corner) of the selected available portion. This latter embodiment is particularly useful if the area of the table 100 exceeds the area of the selected available portion.

Describing in more detail the analysis operation 306, the optimal position for the table 100 within the workspace 112 is determined by taking into consideration the set of undesirable characteristics associated with the positioning of floating objects within the workspace 112. Each of the undesirable characteristics are prioritized according to a scoring format that is based on a predetermined (e.g., by application developer or user) tolerance scheme. In this regard, each undesirable characteristic is associated with a predetermined score that rates that characteristic from most tolerable to least tolerable with respect to all other undesirable characteristics. For example, if the set of undesirable characteristics includes four characteristics, the characteristic deemed most tolerable would be associated with the lowest score of the four characteristics and the characteristic least tolerable would be associated with the highest score of the four characteristics. For illustration purposes, the lowest score is one (1) and the highest score is the number of undesirable characteristics included in the set (e.g., with respect to the example above, four (4)).

Four exemplary undesirable positioning characteristics are illustrated in FIGS. 5A-5D in sequence of tolerability. In each of these figures, the table 100 shown in FIG. 1 has been positioned within the workspace 112 of the document 102 in an undesirable manner.

Figure 5A:
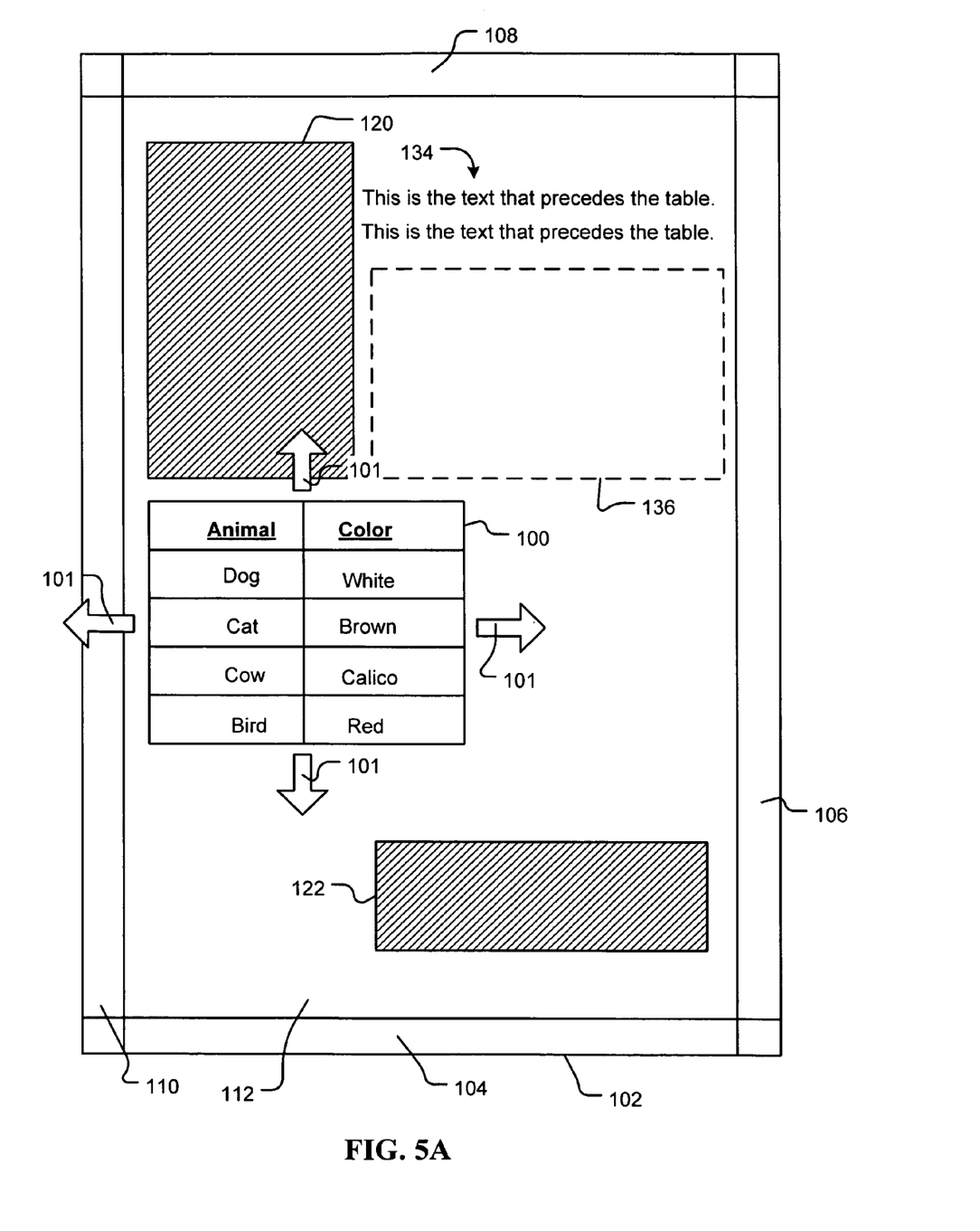
FIGS. 5A-5D illustrate exemplary undesirable characteristics associated with the positioning of floating objects in an electronic document.
Figure 5B:
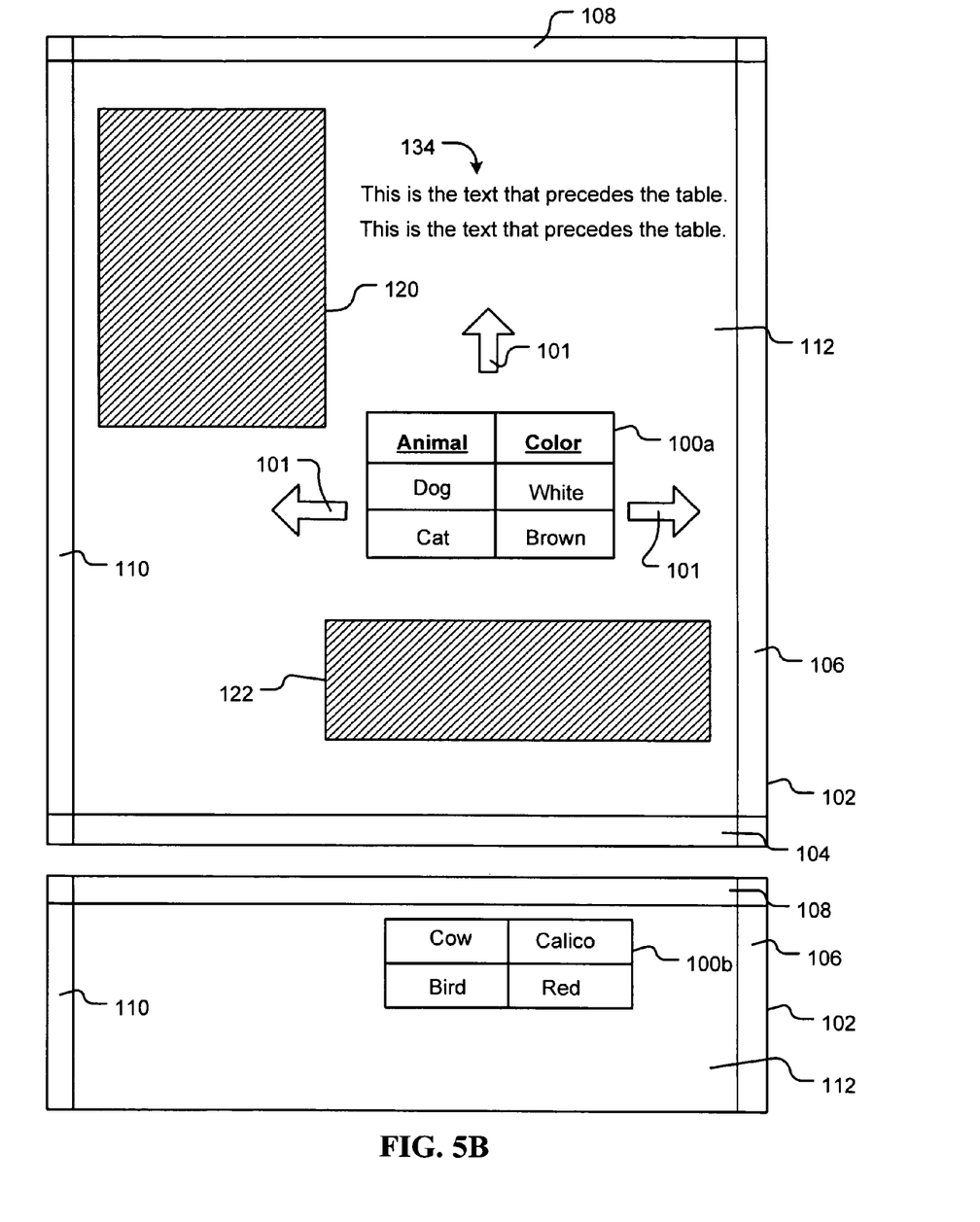
Figure 5C:
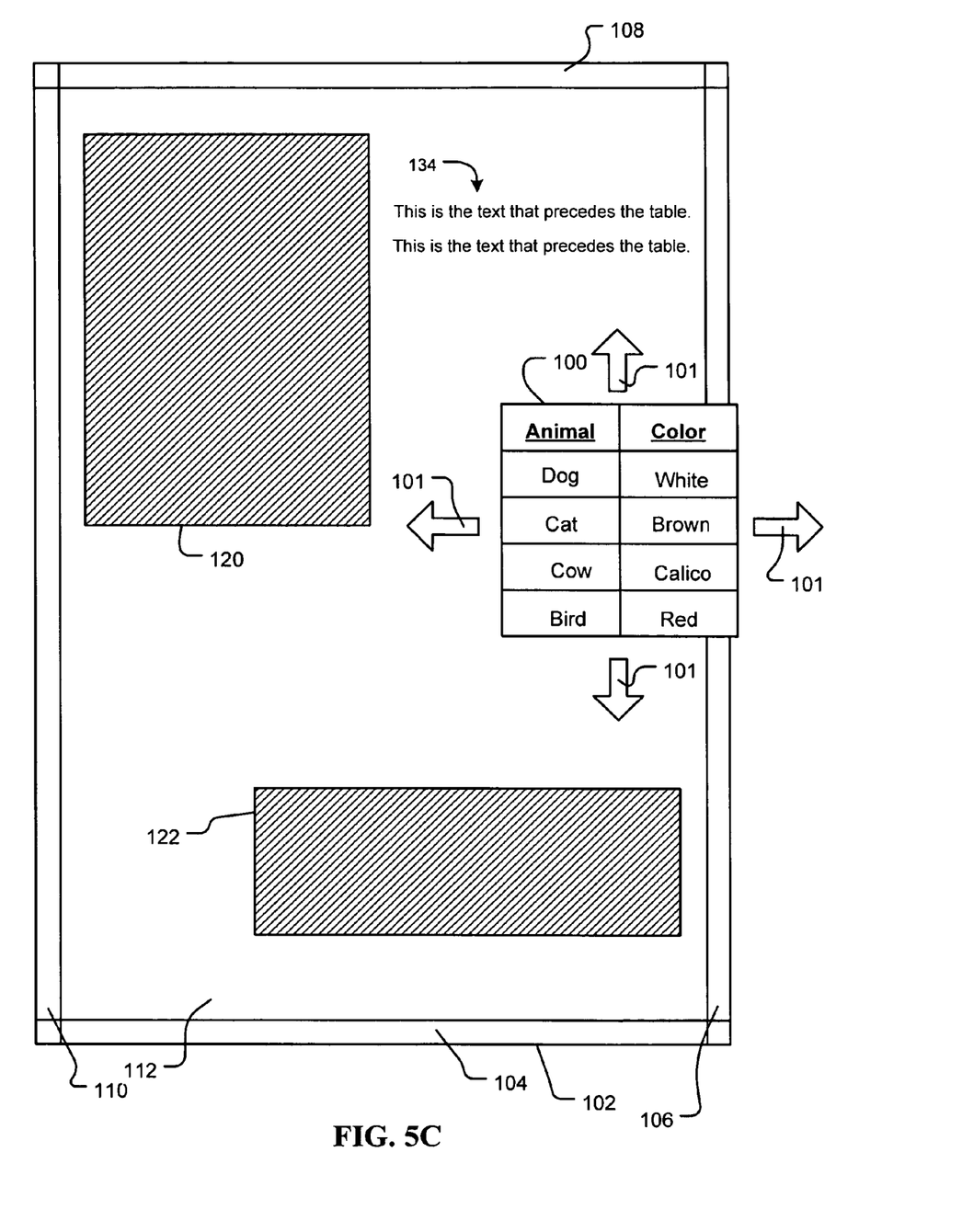
Figure 5D:
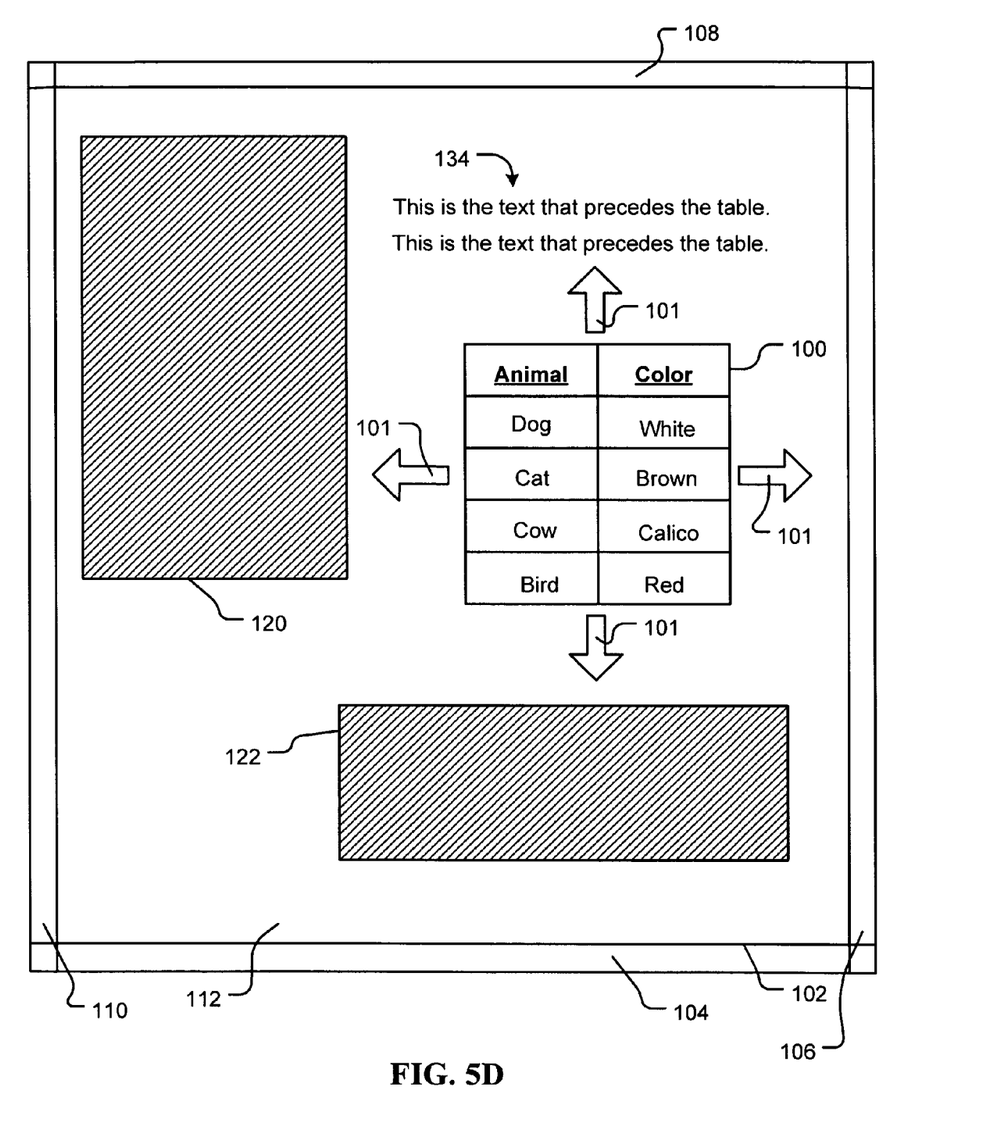

FIG. 5A illustrates the most tolerable of the four exemplary undesirable characteristics and, thus, is associated with the lowest score (e.g., 1) of the four characteristics. FIG. 5B illustrates the second most tolerable of the four exemplary undesirable characteristics and, thus, is associated with the second lowest score (e.g., 2) of the four characteristics. FIG. 5C illustrates the third most tolerable of the four exemplary undesirable characteristics and, thus, is associated with the third lowest score (e.g., 3) of the four characteristics. Finally, FIG. 5D illustrates the least tolerable of the four exemplary undesirable characteristics and, thus, is associated with the highest score (e.g., 4) of the four characteristics.

Specifically, FIG. 5A illustrates a first undesirable characteristic in which there exists white space 136 between the text 134 and the table 100. The white space 136, which is shown generally using dashed lines, is undesirable in that an available portion in the workspace 112 was skipped during the positioning the table 100. Indeed, it is desirable to position floating objects (e.g., 100) within the workspace 112 with minimal gap.

FIG. 5B illustrates a second undesirable characteristic in which the table 100 breaks at a point in workspace 112 that is not at the bottom of a page. Specifically, the table 100 is separated into a first table portion 100a on a first page and a second table portion 100b on a second page, with the first portion 100a being in the middle of the first page. This undesirable separation is based on the positioning of the table 100 in an area (between the absolutely positioned objects 122) within the workspace 112 having vertical dimensions less than the vertical dimensions of the table 100.

FIG. 5C illustrates a third undesirable characteristic that relates to the table 100 not fitting horizontally within its allocated space. In particular, FIG. 5C illustrates the undesirable characteristic of the table 100 extending past a margin (i.e., the right margin 106) in the horizontal direction. Along these same lines, this particular undesirable characteristic refers to the table 100 not fitting horizontally between two obstacles.

FIG. 5D illustrates a fourth undesirable characteristic in which the table 100 has an internally-defined property that is not satisfied. To illustrate, the table 100 has properties that specify that the workspace (e.g., 112) in which the table 100 is positioned is to be clear on both the left and right sides of the table 100 such that no other content is included in that adjacent space. These properties therefore specify that the table 100 is intended to reside in an otherwise empty horizontal section of the workspace (e.g., 112) in which the table 100 resides. As shown in FIG. 5D, the absolutely positioned object 120 is positioned in the workspace 112 on the left side of the table 100. Accordingly, it is undesirable that at least one of these exemplary properties explicitly set for the table 100 is not satisfied.

Referring back to FIG. 3, the foregoing description illustrates an embodiment in which the analysis operation 306 takes tolerability scores into account when determining which of the available portions yield an optimal position for the table 100. In general, the available portion having the lowest tolerability score (i.e., the most tolerable characteristic) is set as the optimal position. For example, an available portion in which insertion of the table 100 results in the characteristic illustrated in FIG. 5B is selected as the optimal position in circumstances where placement of the table 100 into all other available portions results in the characteristic illustrated in FIG. 5D. After the optimal position is determined by the analysis operation 306, the operation flow passes to an insert operation 308. The insert operation 308 inserts the table 110 into the workspace 112 in the determined optimal position. From the insert operation 308, the operation flow concludes at the terminate operation 310.

Figure 6:
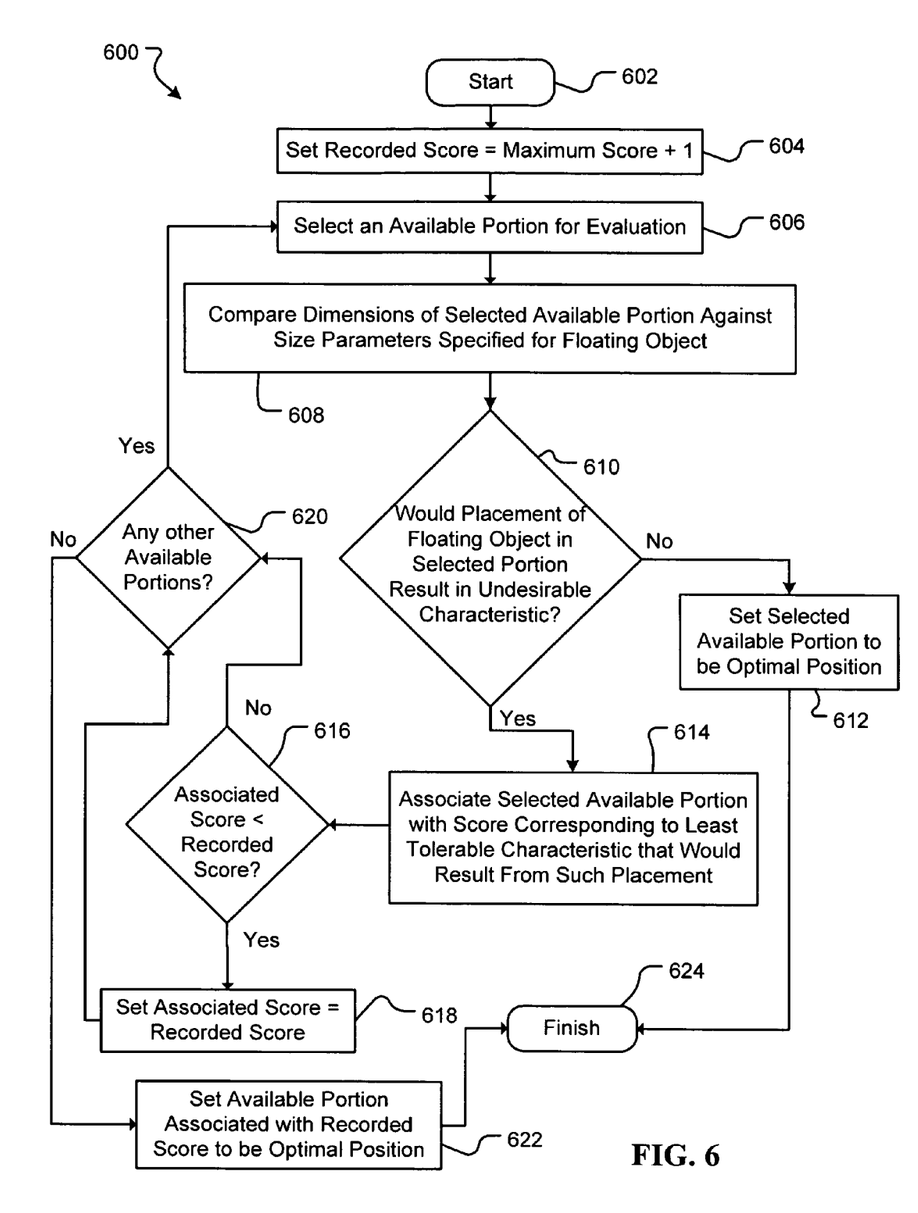
FIG. 6 is a flow diagram illustrating operational characteristics shown in FIG. 3 in more detail in accordance with an embodiment of the present invention.

Turning now to FIG. 6, the analysis operation 306 is shown in greater detail in accordance with an embodiment of the present invention. More particularly, FIG. 6 illustrates a process 600 for analyzing a workspace to determine an optimal position for placement of a floating object therein. As with FIG. 3, the analysis process 600 is described with reference to the exemplary environment of FIG. 1 in which the floating object is the table 100.

The analysis process 600 is performed using an operation flow that begins with a start operation 602 and concludes with a terminate operation 624. The start operation 602 is initiated in response to the operation flow of the positioning process 300 of FIG. 3 passing from the evaluate operation 304 to the analysis operation 306. From the start operation 602, the operation flow of the analysis process 600 passes to an initialize score operation 604.

The initialize score operation 604 initializes a score for use by subsequent operations of the analysis process 600 to determine an optimal position for the table 100. The initialize score operation 604 sets a current, or "recorded," score to one (1) count above the maximum score, which, in an embodiment, is the number of characteristics included in the set of undesirable characteristics, as described above. Thus, in accordance with the exemplary illustration above (with reference to FIGS. 5A-5D), the initialize score operation 604 sets the recorded score to a count of 5. After the recorded score has been initialized, the operation flow passes from the initialize score operation 604 to a select portion evaluation 606.

The select portion operation 606 selects an available portion for analysis against the set of undesirable characteristics. In an embodiment, selection of the available portion is accomplished in random fashion. In another embodiment, the select portion operation 606 selects this available portion for analysis according to a priority-based schedule into which at least some of the available portions (i.e., "candidate portions") are assigned a specific evaluation order. The candidate portions are those portions having an upper boundary occurring in the workspace 112 after the text 136 that is to precede the table 100.

An exemplary approach for use in determining the priority-based schedule involves the select portion operation 606 selecting the candidate portions based on a predetermined priority scheme that takes into consideration a common point associated with each of the available portions relative to the portion of the text flow that is to precede the table 100. For example, if the available portions embody layout rectangles, e.g., 124, 126, 128, 130 and 132, as shown in exemplary fashion in FIG. 4, the common point may be the upper boundary of these rectangles 126, 128, 130 and 132. In this example, the candidate portions are those portions having an upper boundary located in the workspace 112 after the text 134—i.e., the second (126), the third (128), the fourth (130), and fifth (132) layout rectangles.

In this embodiment, an exemplary priority scheme defines the upper boundary as the primary factor in determining the order for evaluation of the candidate layout rectangles 126, 128, 130 and 132 and the horizontal widths as being a secondary, or contingent, factor if two candidate layout rectangles have the same upper boundary. More particularly, the priority scheme specifies that the candidate layout rectangles 126, 128, 130 and 132 are evaluated based on the following order: (1) the closet upper boundary to the endpoint in the text flow that is to precede the table 100 (i.e., the end of text 134); and (2) if two candidate rectangles share the same upper boundary, then the greatest horizontal dimension (e.g., width of the rectangles between the right (e.g., 153) and left (e.g., 154) boundaries).

To illustrate this exemplary priority scheme, the appropriate order for evaluating the layout rectangles in the workspace 112 shown in FIG. 4 is as follows: the second layout rectangle 126, the third layout rectangle 128, then the fourth layout rectangle 130 and, finally, the fifth layout rectangle 132. As noted above, the table 100 is to be placed in the workspace 112 after the text 134. Because the upper boundary of the first layout rectangle 124 precedes the end of the text 134, the first layout rectangle 124 is not a "candidate" portion into which the table 100 may be placed. With respect to all candidate layout rectangles, the second layout rectangle 126 has an upper boundary located closest to the end of the text 134. Consequently, the select portion operation 606 first selects the second layout rectangle 126 for evaluation against the undesirable characteristics. In future iterations of the analysis process 600, the third layout rectangle 128 is selected for evaluation prior to the fourth layout rectangle 130 (even though the upper boundaries are the same) because the horizontal width of the third layout rectangle 128 is greater than the horizontal width of the fourth layout rectangle 130.

After the select portion operation 606 has selected an available portion for evaluation against the undesirable characteristics, the operation flow of the analysis process 600 passes to a compare operation 608. The compare operation 608 compares the dimensions of the selected available portion against size parameters of the table 100 in preparation for analyzing the selected available portion against the set of undesirable characteristics. In this regard, the compare operation 608 establishes a comparison between the table 100 and the selected available portion that logically represents placement of the table 100 into the selected available portion. In an embodiment, the dimensions of the table 100 are fixed and, consequently, the compare operation 608 yields a simple comparison of these fixed dimensions of the table 100 versus the dimensions of the selected available portion. In accordance with another embodiment, the dimensions of the table 100 are dynamic and the compare operation 608 modifies the sizing and/or formatting properties of the table 100 to yield an optimal representation for substantially fitting (if possible) the table 100 into the selected available portion. Regardless of the manner of implementation, however, the operation flow passes to the first query operation 610 following the compare operation 608.

The first query operation 610 evaluates the selected available portion and the table 100 against the predetermined set of undesirable characteristics to determine whether placement of the table 100 into the selected available portion would result in any one of these characteristics. If none of these characteristics would result from such placement, the first query operation 610 branches the operation flow to a first set operation 612. In this case, the first set operation 612 sets the selected available portion as the optimal position without any further analysis of other available portions because placement of the table 100 into the selected available portion doesn't result in an undesirable positioning characteristic. The operation flow then concludes at the terminate operation 624, at which time, the operation flow of the positioning process 300 is resumed at the insertion operation 312.

If however, any one of the undesirable characteristics would result from placement of the table 100 into the selected available portion, further evaluation (of at least one additional available portion) is warranted in order to identify an available portion that would either (1) fail to result in an undesirable characteristic or (2) result in a more tolerable characteristic, as described based on the tolerability scoring system below. Accordingly, the first query operation 610 branches the operation flow to a render score operation 614.

The render score operation 614 associates the selected available portion with the tolerability score associated with the undesirable characteristic that the first query operation 610 determined would result by insertion of the table 100 into the selected available portion. As noted above, the tolerability score is the score that is pre-assigned to the would-be resultant characteristic based on a predetermined level of tolerability of that characteristic relative to all other undesirable characteristics in the set. After the render score operation 614 has associated the selected available portion with a tolerability score, the operation flow passes to a second query operation 616.

The second query operation 616 analyzes the tolerability score associated with the selected available portion against the recorded score. In an embodiment, the second query operation 616 tests as to whether the associated tolerability score is less than the recorded score. If the associated tolerability score is less than the recorded score, then insertion of the table 100 into that available portion currently represents the most tolerable undesirable positioning characteristic relative to all other available portions that have been evaluated during the analysis process 600. Thus, in the first iteration of the analysis process 600, the associated tolerability score will be less than the recorded score since the recorded score equals the maximum score plus one (1), as initialized by the initialize operation 604.

If the tolerability score associated with the selected portion is not less than the recorded score, the operation flow passes to a third query operation 620, which is described below. If, however, the associated tolerability score is less than the recorded score, the second query operation 616 branches the operation flow to a second set operation 618, which sets the recorded score to the tolerability score associated with the selected portion. The operation flow then passes to the third query operation 620.

The third query operation 620 determines whether all of the available portions of the workspace 112 have been evaluated using the analysis process 600. If so, the operation flow passes to a second set operation 624. The second set operation 624 sets the available portion associated with the currently recorded score to be the optimal position. The operation flow then concludes at the terminate operation 624, at which time, the operation flow of the positioning process 300 is resumed at the insertion operation 312. If, however, the third query operation 620 determines that all available portions have not been evaluated using the analysis process 600, the operation flow passes to back to the select operation 606, which selects the next available portion for evaluation by the analysis process 600 and the operation flow continues as described above.

In an embodiment, the select operation 606 selects the candidate portions for evaluation according to the priority-based schedule described above. Thus, with reference to FIG. 4, after the third layout rectangle 128 has been selected by the select operation 606, the next available portion selected by the select operation 606 is the fourth layout rectangle 130 because the upper boundary of the fourth layout rectangle 130 is located above the upper boundary of all the available portions that have not yet been evaluated by the analysis process 600.

Although the present invention has been described in language specific to structural features, methodological acts, and computer readable media containing such acts, it is to be understood that the present invention defined in the appended claims is not necessarily limited to the specific structure, acts, or media described. One skilled in the art will recognize other embodiments or improvements that are within the scope and spirit of the present invention.

For example, while the floating objects are described as tables and the electronic documents are described herein as word processing documents in order to illustrate embodiments of the present invention, it should be appreciated that the present invention is applicable to any type of floating object and, similarly, any type of electronic document. Additionally, the computing device 200 is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

What is claimed is:

1. A computer-implemented method for positioning a floating object within an electronic document, the method comprising:

determining a plurality of available portions within a workspace of the electronic document operable to accept floating objects;

determining a set of undesirable positioning characteristics associated with the positioning of floating objects in the workspace;

setting a recorded score equal to one count above the number of undesirable positioning characteristics included in the set of undesirable positioning characteristics;

determining a priority-based schedule for assigning an evaluation order to each available portion of the plurality of available portions;

selecting a first available portion of the plurality of available portions for evaluation based on the priority schedule;

evaluating placement of the floating object into the first available portion against the set of undesirable positioning characteristics, wherein each undesirable positioning characteristic in the set of undesirable positioning characteristics is associated with a predetermined tolerability score from a plurality of tolerability scores, and wherein each tolerability score is based on a predetermined level of tolerability of the associated undesirable positioning characteristic relative to the other undesirable positioning characteristics in the set of undesirable positioning characteristics;

when placement of the floating object into the first available portion would not result in any of the undesirable positioning characteristics, setting the first available portion as an optimal position for the floating object in the workspace and inserting the floating object in the workspace according to the optimal position;

when placement of the floating object into the first available portion would result in at least one undesirable positioning characteristic, associating the first available portion with the tolerability score associated with the at least one undesirable positioning characteristic that would result by placement of the floating object into the first available portion;

determining whether the associated tolerability score is less than the recorded score; and when the associated tolerability score is less than the recorded score, setting the recorded score to the associated tolerability score for the first available portion;

determining if a next available portion based on the priority schedule remains to be evaluated; and repeating the evaluating placement of the floating object for the next available portion against the set of undesirable positioning characteristics to determine the available portion of the plurality of available portions to be set as the optimal position for inserting the floating object in the workspace.

2. The method of claim 1, wherein the floating object is a table.

3. The method of claim 2, wherein a first undesirable positioning characteristic relates to the existence of empty space between a body of text in the workspace and the table.

4. The method of claim 3, wherein the workspace spans a plurality of pages or columns and wherein a second undesirable positioning characteristic relates to the table being broken in an undesirable location on a first of the plurality of pages or a first of the plurality of columns if the table were placed in an available portion under evaluation, wherein the predetermined tolerability of the first undesirable positioning characteristic is greater than the predetermined tolerability of the second undesirable positioning characteristic.

5. The method of claim 4, wherein the workspace is bounded by a left margin and a right margin and wherein a third undesirable positioning characteristic relates to the table extending past either the left or the right margin if the table were placed in an available portion under evaluation, wherein the predetermined tolerability of the second undesirable positioning characteristic is greater than the predetermined tolerability of the third undesirable positioning characteristic.

6. The method of claim 5, wherein a fourth undesirable positioning characteristic relates to an internally-defined property for the table not being satisfied if the table is placed in an available portion under evaluation, wherein the predetermined tolerability of the third undesirable positioning characteristic is greater than the predetermined tolerability of the fourth undesirable positioning characteristic.

7. The method of claim 1, wherein the electronic document comprises obstacles located in the workspace, the act of determining available portions comprising:

determining the available portions to be geometrical areas within the workspace that do not include an obstacle.

8. The method of claim 1, wherein the workspace is bounded by margins of the electronic document.

9. The method of claim 1, wherein the workspace is bounded by column delimiters.

10. A computer storage medium having stored thereon computer executable instructions that when executed by a processor perform a method for positioning a floating object within an electronic document, the method comprising:

determining a plurality of available portions within a workspace of the electronic document operable to accept floating objects;

determining a set of undesirable positioning characteristics associated with the positioning of floating objects in the workspace;

setting a recorded score equal to one count above the number of undesirable positioning characteristics included in the set of undesirable positioning characteristics;

determining a priority-based schedule for assigning an evaluation order to each available portion of the plurality of available portions;

selecting a first available portion of the plurality of available portions for evaluation based on the priority schedule;

evaluating placement of the floating object into the first available portion against the set of undesirable positioning characteristics, wherein each undesirable positioning characteristic is associated with a predetermined tolerability score from a plurality of tolerability scores, and wherein each tolerability score is based on a predetermined level of tolerability of the associated undesirable positioning characteristic relative to the other undesirable positioning characteristics in the set of undesirable positioning characteristics;

when placement of the floating object into the first available portion would not result in any of the undesirable positioning characteristics, setting the first available portion to be the optimal position for the floating object within the workspace and inserting the floating object in the workspace according to the optimal position;

when placement of the floating object into the first available portion would result in at least one undesirable positioning characteristic, associating the first available portion with the tolerability score associated with the at least one undesirable positioning characteristic that would result by placement of the floating object into the first available portion;

determining whether the associated tolerability score is less than the recorded score; and when the associated tolerability score is less than the recorded score, setting the recorded score to the associated tolerability score for the first available portion;

determining if a next available portion based on the priority schedule remains to be evaluated; and repeating the evaluating placement of the floating object for the next available portion against the set of undesirable positioning characteristics to determine the available portion of the plurality of available portions to be set as the optimal position for inserting the floating object in the workspace.

11. The computer storage medium of claim 10, wherein the floating object is a table, and wherein a first undesirable positioning characteristic relates to the existence of empty space between a body of text in the workspace and the table.

12. The computer storage medium of claim 11, wherein the workspace spans a plurality of pages or columns and wherein a second undesirable positioning characteristic relates to the table being broken in an undesirable location on a first of the plurality of pages or a first of the plurality of columns if the table were placed in an available portion under evaluation, wherein the predetermined tolerability of the first undesirable positioning characteristic is greater than the predetermined tolerability of the second undesirable positioning characteristic.

13. The computer storage medium of claim 12, wherein the workspace is bounded by a left margin and a right margin and wherein a third undesirable positioning characteristic relates to the table extending past either the left or the right margin if the table were placed in an available portion under evaluation, wherein the predetermined tolerability of the second undesirable positioning characteristic is greater than the predetermined tolerability of the third undesirable positioning characteristic.

14. The computer storage medium of claim 13, wherein a fourth undesirable positioning characteristic relates to an internally-defined property for the table not being satisfied if the table is placed in an available portion under evaluation, wherein the predetermined tolerability of the third undesirable positioning characteristic is greater than the predetermined tolerability of the fourth undesirable positioning characteristic.

15. The computer storage medium of claim 10, wherein the electronic document comprises obstacles located in the workspace, the act of determining available portions comprising:

determining the available portions to be geometrical areas within the workspace that do not include an obstacle.

16. The computer storage medium of claim 10, wherein the workspace is bounded by margins of the electronic document.

17. The computer storage medium of claim 10, wherein the workspace is bounded by column delimiters.

* * * * *